United States Patent
Nakajima et al.

(10) Patent No.: US 12,107,208 B2
(45) Date of Patent: Oct. 1, 2024

(54) NONAQUEOUS ELECTROLYTE SECONDARY BATTERY

(71) Applicant: GS Yuasa International Ltd., Kyoto (JP)

(72) Inventors: Kaname Nakajima, Kyoto (JP); Heisuke Nishikawa, Kyoto (JP); Shuji Hitomi, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 45 days.

(21) Appl. No.: 17/517,347

(22) Filed: Nov. 2, 2021

(65) Prior Publication Data

US 2022/0131177 A1 Apr. 28, 2022

Related U.S. Application Data

(63) Continuation of application No. 15/766,866, filed as application No. PCT/JP2016/004426 on Sep. 30, 2016, now Pat. No. 11,196,078.

(30) Foreign Application Priority Data

| Oct. 14, 2015 | (JP) | 2015-202630 |
| Nov. 6, 2015 | (JP) | 2015-218141 |
| Jun. 1, 2016 | (JP) | 2016-109738 |

(51) Int. Cl.
*H01M 10/0568* (2010.01)
*H01M 4/58* (2010.01)
(Continued)

(52) U.S. Cl.
CPC ........... *H01M 10/045* (2013.01); *H01M 4/58* (2013.01); *H01M 4/5815* (2013.01);
(Continued)

(58) Field of Classification Search
None
See application file for complete search history.

(56) References Cited

U.S. PATENT DOCUMENTS

| 4,707,422 A | 11/1987 | de Neufville |
| 6,949,318 B2 | 9/2005 | Choi |

(Continued)

FOREIGN PATENT DOCUMENTS

| CN | 103068473 A | 4/2013 |
| JP | H08130034 A | 5/1996 |

(Continued)

OTHER PUBLICATIONS

Bauer, I. et al., "Reduced polysulfide shuttle in lithium-sulfur batteries using Nafion-based separators," Journal of Power Sources, Dec. 7, 2013, p. 417-422, vol. 251, Elsevier, The Netherlands; Cited in Specification.

(Continued)

*Primary Examiner* — Tracy M Dove
(74) *Attorney, Agent, or Firm* — RANKIN, HILL & CLARK LLP

(57) ABSTRACT

A nonaqueous electrolyte secondary battery includes a sulfur-containing positive electrode, a negative electrode, a nonaqueous electrolyte, and a cation exchange resin layer which is disposed between the positive electrode and the negative electrode and has a first surface having a roughness factor of 3 or more.
A method for producing a nonaqueous electrolyte secondary battery includes a sulfur-containing positive electrode, a negative electrode, and a cation exchange resin layer which is interposed between the positive electrode and the negative electrode and has a first surface having a roughness factor of 3 or more.
The method includes injecting a lithium polysulfide-containing positive electrode electrolyte between the positive (Continued)

electrode and the cation exchange resin layer, and injecting a negative electrode electrolyte between the negative electrode and the cation exchange resin layer, the negative electrode electrolyte having a lithium polysulfide concentration lower than that of the positive electrode electrolyte.

11 Claims, 5 Drawing Sheets

(51) Int. Cl.
*H01M 10/04* (2006.01)
*H01M 10/052* (2010.01)
*H01M 10/0525* (2010.01)
*H01M 10/0561* (2010.01)
*H01M 10/0567* (2010.01)
*H01M 10/058* (2010.01)
*H01M 50/46* (2021.01)
*H01M 50/489* (2021.01)
*H01M 4/02* (2006.01)
*H01M 50/417* (2021.01)

(52) U.S. Cl.
CPC ....... *H01M 10/049* (2013.01); *H01M 10/052* (2013.01); *H01M 10/0525* (2013.01); *H01M 10/0561* (2013.01); *H01M 10/0567* (2013.01); *H01M 10/0568* (2013.01); *H01M 10/058* (2013.01); *H01M 50/46* (2021.01); *H01M 50/489* (2021.01); *H01M 2004/028* (2013.01); *H01M 50/417* (2021.01); *H01M 2300/0017* (2013.01); *H01M 2300/0037* (2013.01); *Y02E 60/10* (2013.01); *Y02T 10/70* (2013.01)

(56) References Cited

U.S. PATENT DOCUMENTS

| | | |
|---|---|---|
| 9,093,710 B2 | 7/2015 | Kourtakis |
| 2013/0146450 A1 | 6/2013 | Kishino et al. |
| 2013/0183550 A1 | 7/2013 | Kourtakis |
| 2015/0140360 A1 | 5/2015 | Kourtakis |
| 2015/0171469 A1 | 6/2015 | Grier |
| 2015/0188109 A1 | 7/2015 | Kim et al. |
| 2015/0249244 A1 | 9/2015 | Brueckner |
| 2016/0190640 A1 | 6/2016 | Visco |
| 2016/0285135 A1 | 9/2016 | Murakami |

FOREIGN PATENT DOCUMENTS

| | | |
|---|---|---|
| JP | H11339808 A | 12/1999 |
| JP | 2000215916 A | 8/2000 |
| JP | 2001200079 A | 7/2001 |
| JP | 2003017128 A | 1/2003 |
| JP | 2008152985 A | 7/2008 |
| JP | 2010192385 A | 9/2010 |
| JP | 2015507837 A | 3/2015 |
| JP | 2015511391 | 4/2015 |
| JP | 2015128063 A2 | 7/2015 |
| JP | 2015520502 A | 7/2015 |
| JP | 2015531978 A | 11/2015 |
| WO | 2011016342 A1 | 2/2011 |
| WO | 2015083314 A1 | 6/2015 |
| WO | 2015141952 A1 | 9/2015 |

OTHER PUBLICATIONS

Jin, Zhaoqing, et al., "Application of lithiated Nafion ionomer film as functional separator for lithium sulfur cells," Journal of Power Sources, Jul. 7, 2012, p. 163-167, vol. 218, Elsevier, The Netherlands; Cited in Specification.

Chen, Hong-Yan et al., "Dextran based highly conductive hydrogel polysulfide electrolyte for efficient quasi-solid-state quantum dot-sensitized solar cells," Electrochimica Acta, Jan. 11, 2013, p. 117-123, vol. 92, Elsevier, The Netherlands.

Cai, Zhijun et al., "High performance of lithium-ion polymer battery based on non-aqueous lithiated perfluorinated sulfonic ion-exchange membranes," Energy & Environmental Science, Dec. 13, 2011, p. 5690-5693 plus S1, vol. 5, The Royal Society of Chemistry, United Kingdom.

International Search Report dated Jan. 10, 2017 filed in PCT/JP2016/004426.

Extended European Search Report (EESR) dated May 6, 2019 issued in the corresponding European patent application No. 16855099.4.

NONAQUEOUS ELECTROLYTE SECONDARY BATTERY

TECHNICAL FIELD

The present invention relates to a nonaqueous electrolyte secondary battery.

BACKGROUND ART

Nonaqueous electrolyte secondary batteries typified by lithium ion secondary batteries are widely used in portable terminals, electric vehicles, hybrid vehicles and the like, and it is expected that the energy density will continue to increase in the future. Currently, in lithium ion secondary batteries that have been put to practical use, a lithium transition metal oxide is mainly used as a positive active material, a carbon material is mainly used as a negative active material, and a nonaqueous electrolyte with a lithium salt dissolved in a nonaqueous solvent is mainly used as an electrolyte.

Studies on use of sulfur as a replacement for a lithium transition metal oxide as a positive active material for a nonaqueous electrolyte secondary battery are being conducted. Sulfur has a large theoretical capacity of 1675 mAh/g per mass, and is therefore expected as a next generation positive active material for increasing the capacity.

However, there is the problem that a shuttle phenomenon occurs in which lithium polysulfide ($Li_2S_n$, $4 \leq n \leq 8$) generated in a positive electrode during charge-discharge is dissolved in a nonaqueous electrolyte, reaches a negative electrode, and is reduced, resulting in progress of self discharge. A technique is known in which a cation exchange resin layer is disposed between a positive electrode and a negative electrode for suppressing shuttle phenomenon (Patent Documents 1 to 3 and Non-Patent Documents 1 and 2).

PRIOR ART DOCUMENTS

Patent Documents

Patent Document 1: JP-A-2015-128063
Patent Document 2: WO 2015/083314
Patent Document 3: JP-W-2015-507837

Non-Patent Documents

Non-Patent Document 1: Journal of Power Sources, Vol. 251, p. 417-422 (2014)
Non-Patent Document 2: Journal of Power Sources, Vol. 218, p. 163-167 (2012)

SUMMARY OF THE INVENTION

Problems to be Solved by the Invention

The present inventors have found that there is a problem that when a cation exchange resin layer is provided between a positive electrode and a negative electrode, resistance at the interface between the positive electrode and the cation exchange resin layer or between the negative electrode and the cation exchange resin layer is high, and thus a nonaqueous electrolyte secondary battery including a cation exchange resin has low high rate discharge performance.

Means for Solving the Problems

For solving the problem described above, a nonaqueous electrolyte secondary battery according to one aspect of the present invention includes a sulfur-containing positive electrode, a negative electrode, a nonaqueous electrolyte, and a cation exchange resin layer which is disposed between the positive electrode and the negative electrode, and has a first surface having a roughness factor of 3 or more.

Advantages of the Invention

According to one aspect of the present invention, there can be provided a nonaqueous electrolyte secondary battery in which the interface resistance of a first surface of a cation exchange resin layer is low, so that excellent high rate discharge performance is exhibited.

MODE FOR CARRYING OUT THE INVENTION

Figure 1:
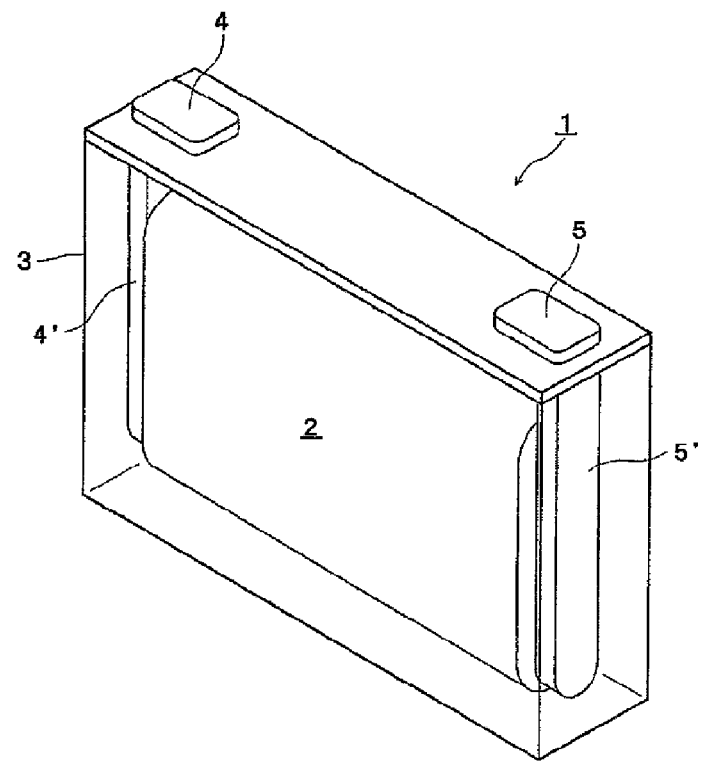
FIG. 1 is a perspective view of an appearance of a nonaqueous electrolyte secondary battery according to an embodiment.

A nonaqueous electrolyte secondary battery according to one aspect of the present invention includes a sulfur-containing positive electrode, a negative electrode, a nonaqueous electrolyte, and a cation exchange resin layer which is disposed between the positive electrode and the negative electrode, and has a first surface having a roughness factor of 3 or more.

With the above-mentioned configuration, the interface resistance of the first surface of the cation exchange resin layer is reduced, so that the high rate discharge performance of the nonaqueous electrolyte secondary battery is improved.

The arithmetic mean roughness Ra of the first surface of the cation exchange resin layer is preferably 0.5 μm or more.

When the arithmetic mean roughness Ra of the first surface of the cation exchange resin layer is 0.5 μm or more, interface resistance can be reduced.

The maximum height roughness Rz of the first surface of the cation exchange resin layer is preferably 5 μm or more.

When the maximum height roughness Rz of the first surface of the cation exchange resin layer is 5 μm or more, the interface resistance of the first surface of the cation exchange resin layer can be reduced even when the electrolyte salt concentration is low.

The nonaqueous electrolyte secondary battery may further include a porous layer. Here, the porous layer is preferably in contact with the first surface of the cation exchange resin layer.

In the cation exchange resin layer, a cation moves selectively (preferentially), and an anion hardly moves as will be described in detail later. On the other hand, in a porous layer impregnated with a nonaqueous electrolyte containing a cation and an anion, both the cation and the anion can move. Thus, in a nonaqueous electrolyte secondary battery including a cation exchange resin layer and a porous layer, there is a difference in ion migration mechanism, and therefore the value of resistance of the interface between the cation exchange resin layer and the porous layer tends to be large. Thus, by applying this embodiment to a nonaqueous electrolyte secondary battery having high interface resistance, interface resistance is remarkably reduced, so that a nonaqueous electrolyte secondary battery having excellent high rate discharge performance can be obtained.

The nonaqueous electrolyte may include a positive electrode electrolyte disposed between the positive electrode and the cation exchange resin layer, and a negative electrode electrolyte disposed between the negative electrode and the cation exchange resin layer. The positive electrode electrolyte may contain lithium polysulfide. The sulfur equivalent concentration of the negative electrode electrolyte is preferably lower than the sulfur equivalent concentration of the positive electrode electrolyte.

With the above-mentioned configuration, a nonaqueous electrolyte secondary battery excellent in charge-discharge cycle performance can be obtained.

In the above-mentioned configuration, the sulfur equivalent concentration of the positive electrode electrolyte is preferably 1.2 mol/l or more.

With such a configuration, not only charge-discharge cycle performance is further improved, but also charge-discharge efficiency after cycle can be enhanced.

In the above-mentioned configuration, the sulfur equivalent concentration of the positive electrode electrolyte is preferably 3.0 mol/l or more.

With such a configuration, a nonaqueous electrolyte secondary battery having a high capacity and high energy density can be provided.

The sulfur equivalent concentration of the positive electrode electrolyte is preferably 18 mol/l or less.

With such a configuration, a nonaqueous electrolyte secondary battery having a high sulfur utilization factor, and high energy density can be obtained because the viscosity of the positive electrode electrolyte does not excessively increase, and interface resistance between the positive electrode electrolyte and the cation exchange resin layer does not excessively increase.

In the above-mentioned configuration, the concentration of an anion contained in at least one of the positive electrode electrolyte and the negative electrode electrolyte is preferably 0.7 mol/l or less.

With such a configuration, it is possible to obtain a nonaqueous electrolyte secondary battery having low interface resistance between a nonaqueous electrolyte and a cation exchange resin layer.

The concentration of an anion contained in the positive electrode electrolyte is preferably 0.3 mol/l or less.

With the above-mentioned configuration, interface resistance between the nonaqueous electrolyte and the cation exchange resin layer hardly increases even when the concentration of lithium polysulfide contained in the positive electrode electrolyte is increased, and thus a nonaqueous electrolyte secondary battery having a high capacity can be obtained.

The nonaqueous electrolyte secondary battery may have a configuration in which at least one of the positive electrode and the negative electrode contains a cation exchange resin, and the concentration of an anion contained in the nonaqueous electrolyte is 0.7 mol/l or less.

With such a configuration, a nonaqueous electrolyte secondary battery having excellent charge-discharge cycle performance can be obtained.

Hereinafter, a nonaqueous electrolyte secondary battery according to an embodiment of the present invention will be described. All of the embodiments described below show one preferred specific example of the present invention. Numerical values, shapes, materials, constituent elements, arrangement positions and connection forms of the constituent elements, and the like as shown in the following embodiments are illustrative, and are not intended to limit the present invention. Among the constituent elements in the following embodiments, constituent elements that are not described in independent claims showing the top level concept of the present invention will be described as optional constituent elements that constitute a more preferred form.

The nonaqueous electrolyte secondary battery according to this embodiment includes a sulfur-containing positive electrode, a negative electrode, a cation exchange resin layer interposed between the positive electrode and the negative electrode, a positive electrode electrolyte (one example of a nonaqueous electrolyte) disposed between the positive electrode and the cation exchange resin layer, and a negative electrode electrolyte (one example of a nonaqueous electrolyte) disposed between the negative electrode and the cation exchange resin layer, the cation exchange resin layer having a first surface having a roughness factor of 3 or more. The nonaqueous electrolyte to be used in the nonaqueous electrolyte secondary battery normally contains an electrolyte salt and a nonaqueous solvent, but in this specification, a nonaqueous solvent which does not contain an electrolyte salt may be referred to as a "nonaqueous electrolyte". The roughness factor is a ratio of an actual surface area to an apparent unit surface area (geometric unit area), which is an index indicating the roughness of the surface.

The cation exchange resin layer is a layer containing a cation exchange resin, and functions as a separator that keeps the positive electrode and the negative electrode insulated from each other. The cation exchange resin has a structure in which anionic functional groups such as sulfonic acid groups and carboxylic acid groups are bonded in a polymer mainly composed of a hydrocarbon. Due to the electrostatic interaction of the anionic groups, the cation exchange resin has high cation permeability, but has low permeability to an anion. That is, the cation exchange resin allows lithium ions to pass therethrough, and hinders passage of lithium polysulfide made anionic by slight dissolution in the positive electrode electrolyte (electrolyte solution). Accordingly, the cation exchange resin layer suppresses movement of lithium polysulfide from the positive electrode to the negative electrode, and therefore a shuttle phenomenon is suppressed.

In the cation exchange resin layer according to this embodiment, the lower limit of the roughness factor of at least a first surface which is one surface is 3, preferably 4, more preferably 10. The upper limit of the roughness factor of the first surface of the cation exchange resin layer is preferably 20, more preferably 18, still more preferably 16. When the roughness factor is 3 or more, resistance at the interface between the cation exchange resin layer and the nonaqueous electrolyte decreases, so that the high rate discharge performance of the nonaqueous electrolyte secondary battery is improved.

The first surface of the cation exchange resin layer in this embodiment has an arithmetic mean roughness Ra of preferably 0.5 µm or more, more preferably 2 µm or more as defined by JIS B 0601:2013. When the arithmetic mean roughness Ra falls within the above-mentioned range, resistance at the interface between the cation exchange resin layer and the positive electrode can be reduced. Further, for maintaining the strength of the cation exchange resin layer, the arithmetic mean roughness Ra is preferably 10 µm or less, more preferably 8 µm or less, still more preferably 5 µm or less.

The first surface of the cation exchange resin layer in this embodiment has a maximum height roughness Rz of preferably 5 µm or more, more preferably 10 µm or more as defined in JIS B 0601:2013. When the maximum height roughness Rz falls within the above-mentioned range, interface resistance can be reduced even at a low electrolyte salt concentration in the nonaqueous electrolyte. The maximum height roughness Rz is preferably 30 µm or less, more preferably 28 µm or less.

The roughness factor, the arithmetic mean roughness Ra and the maximum height roughness Rz of the first surface of the cation exchange resin layer are determined by photographing and measuring a surface of the cation exchange resin layer under the following conditions, and performing shape analysis.

Measuring equipment: Ultra-Deep Shape Measurement Microscope VK-8500 (Manufactured by KEYENCE CORPORATION)
  Measurement range: $1.04 \times 10^{-3}$ cm$^2$
  Shape analysis application: VK-H1A9 (Manufactured by KEYENCE CORPORATION)

Examples of the method of roughening treatment for setting the roughness factor of a surface of the cation exchange resin layer according to this embodiment to 3 or more include a method in which a surface of the cation exchange resin layer is roughened with a polishing material such as sandpaper; a sandblasting method and a chemical etching method. As the polishing material, it is preferable to use a sand paper in which a polishing agent for polished cloth and paper has a grain size of 320 to 1000 as specified in JIS R 6010:2000.

The thickness of the cation exchange resin layer according to this embodiment is preferably from 20 to 180 µm, more preferably from 30 to 180 µm. When the thickness is 30 µm or more, the cation exchange resin layer retains a sufficient thickness even when subjected to a roughening treatment, and therefore handling during production of a battery is facilitated. When the thickness is 180 µm or less, the internal resistance of a battery can be reduced, and the energy density of a battery can be improved.

The cation exchange resin layer may be one obtained by molding a mixture of a cation exchange resin and other polymer into a thin-film shape, and roughening the molded product. As the other polymer, a material that forms a porous layer as described later can be appropriately used.

The nonaqueous electrolyte secondary battery according to this embodiment may further include a porous layer. The porous layer is preferably in contact with the first surface of the cation exchange resin layer.

Normally, surfaces of the positive electrode and the negative electrode have irregularities derived from the particulate active material. Thus, when a cation exchange resin layer having low flexibility is used, the contact area between the roughened first surface and the positive electrode or the negative electrode may decrease as compared to a case where the first surface is not roughened. The porous layer containing a polymer is superior in flexibility to the cation exchange resin layer, and therefore when the porous layer is in contact with the first surface of the cation exchange resin layer, contact between the positive electrode and the porous layer and between the porous layer and the cation exchange resin layer, or contact between the negative electrode and the porous layer and between the porous layer and the cation exchange resin layer is well maintained, so that lithium ions are well transmitted. Further, since the nonaqueous electrolyte can be held in the porous layer, uneven distribution of the nonaqueous electrolyte in the positive electrode or the negative electrode hardly occurs, so that the charge-discharge reaction at the positive electrode or the negative electrode can be made uniform.

The porous layer may be provided only between the positive electrode and the first surface of the cation exchange resin layer, or provided only between the negative electrode and the first surface of the cation exchange resin layer. Alternatively, the porous layer may be provided between the positive electrode and the cation exchange resin layer and between the negative electrode and the cation exchange resin layer.

In this embodiment, it is preferable that the positive electrode electrolyte contains lithium polysulfide. Further, the sulfur equivalent concentration of the positive electrode electrolyte is preferably higher than the sulfur equivalent concentration of the negative electrode electrolyte. Hereinafter, the "positive electrode electrolyte" and "negative electrode electrolyte" may be collectively referred to as a "nonaqueous electrolyte".

Although movement of lithium polysulfide from the positive electrode to the negative electrode is suppressed by the cation exchange resin layer, lithium polysulfide generated in the positive electrode during a charge-discharge reaction has high solubility in a nonaqueous solvent, and is therefore easily dissolved in the positive electrode electrolyte during a charge-discharge cycle. The present inventors have found that by mixing lithium polysulfide with a positive electrode electrolyte disposed between a positive electrode and a cation exchange resin layer, in advance, not only dissolution of lithium polysulfide generated in the positive electrode is suppressed, but also lithium polysulfide in the positive electrode electrolyte contributes to a charge-discharge reaction as a positive active material, so that excellent charge-discharge cycle performance can be exhibited. That is, in this embodiment, the positive electrode electrolyte contains lithium polysulfide, and the positive electrode electrolyte has a sulfur equivalent concentration higher than the sulfur equivalent concentration of the negative electrode electrolyte. Thus, a nonaqueous electrolyte secondary battery having high charge-discharge cycle performance can be obtained. Here, the sulfur equivalent concentration is a value obtained by calculating the concentration of a sulfur compound in the nonaqueous electrolyte in terms of a concentration of sulfur atoms. That is, 1 mol/l lithium sulfide ($Li_2S$) corresponds to a sulfur equivalent concentration of 1 mol/l, 1 mol/l $Li_2S_6$ corresponds to a sulfur equivalent concentration of 6 mol/l, and 1 mol/l of sulfur ($S_8$) corresponds to a sulfur equivalent concentration of 8 mol/l.

The lower limit of the sulfur equivalent concentration of the positive electrode electrolyte is preferably 1.2 mol/l, more preferably 1.5 mol/l, still more preferably 3.0 mol/l. When the sulfur equivalent concentration is 1.2 mol/l or more, charge-discharge efficiency after charge-discharge cycle is improved. When the sulfur equivalent concentration is 3.0 mol/l or more, a nonaqueous electrolyte secondary battery having a high capacity and high energy density can be provided.

The upper limit of the sulfur equivalent concentration of the positive electrode electrolyte is preferably 18 mol/l, more preferably 12 mol/l, still more preferably 9 mol/l. When the sulfur equivalent concentration is not more than the above-mentioned upper limit, a nonaqueous electrolyte secondary battery having a high sulfur utilization factor and high energy density can be obtained because the viscosity of the positive electrode electrolyte does not excessively increase, and interface resistance between the positive electrode electrolyte and the cation exchange resin layer does not excessively increase.

The lithium polysulfide contained in the positive electrode electrolyte is not particularly limited, but is preferably lithium polysulfide represented by $Li_2S_n$ (4≤n≤8).

A method for producing lithium polysulfide represented by the composition formula: $Li_2S_n$ (4≤n≤8) is not limited. For example, the above-mentioned lithium polysulfide can be obtained in the following manner: a lithium sulfide ($Li_2S$) and sulfur ($S_8$) are mixed and stirred at a target composition ratio in a solvent, and the mixture is then added in a closed container, and reacted in a thermostatic bath at 80° C. for 4 days or more.

In this embodiment, it is preferable that the negative electrode electrolyte has a sulfur equivalent concentration lower than that of the positive electrode electrolyte. That is, the sum of the concentrations of elemental sulfur, lithium polysulfide and $Li_2S$ which are contained in the negative electrode electrolyte is preferably lower than that of the positive electrode electrolyte. Lithium polysulfide reacts with a negative active material, so that the charge depth of the negative active material is reduced, and $Li_2S$ is generated as a reduction product. $Li_2S$ is insoluble in a nonaqueous solvent, and is therefore deposited on a surface of the negative electrode to decrease the reaction area of the negative electrode. Thus, the upper limit of the sulfur equivalent concentration of the negative electrode electrolyte is preferably 0.5 mol/l, and may be 0 mol/l. Since it is known that lithium polysulfide reacts on a negative electrode surface to form a solid electrolyte film (SEI), it is preferable that the negative electrode electrolyte contains a small amount of lithium polysulfide.

In the nonaqueous electrolyte secondary battery according to this embodiment, it is preferable that at least one of the positive electrode and the negative electrode includes a cation exchange resin. Here, the concentration of an anion contained in the nonaqueous electrolyte is more preferably 0.7 mol/l or less.

The aspect in which at least one of the positive electrode and the negative electrode includes a cation exchange resin is not particularly limited, but it is preferable that the cation exchange resin is provided on a surface of or in a positive composite layer or a negative composite layer. That is, the cation exchange resin may cover a surface of the composite layer, or may be present in at least a part of the inside of the composite layer.

As described above, the cation exchange resin allows only a cation to pass therethrough, and hinders passage of an anion. Therefore, the transport number of lithium ions in the cation exchange resin is approximately 1. That is, the cation exchange resin is a single ion conductor. On the other hand, in a nonaqueous electrolyte containing a lithium salt, both the lithium ion and the counter anion move, so that the transport number of lithium ions is not 1, and thus the nonaqueous electrolyte is not a single ion conductor. Since there is a difference in ion migration mechanism as described above, the interface between the nonaqueous electrolyte and the cation exchange resin layer has high interface resistance.

At least one of the positive electrode and the negative electrode contains a cation exchange resin, so that a lithium conduction path composed of the cation exchange resin is formed between the cation exchange resin layer and a positive active material or a negative active material. That is, since lithium ions can move back and forth between the cation exchange resin layer and the positive active material or the negative active material without passing through the nonaqueous electrolyte, interface resistance of the cation exchange resin layer can be reduced. Accordingly, it is supposed that a nonaqueous electrolyte secondary battery having a high discharge capacity and excellent charge-discharge cycle performance can be obtained.

The amount of the cation exchange resin in the positive composite layer is preferably 10% by mass to 150% by mass based on the total mass of the positive composite layer. It is preferable that the amount of the cation exchange resin is 10% by mass to 150% by mass based on the total mass of the positive composite layer because a continuous lithium ion conduction channel can be formed in the positive composite layer.

The amount of the cation exchange resin in the negative composite layer is preferably 10% by mass to 150% by mass based on the total mass of the negative composite layer. It is preferable that the amount of the cation exchange resin is 10% by mass to 150% by mass based on the total mass of the negative composite layer because a continuous lithium ion conduction channel can be formed in the negative composite layer.

A positive electrode with a cation exchange resin present in a positive composite layer can be prepared in the following manner. A particulate positive active material, a cation exchange resin, a conductive agent and a binding agent are mixed with a dispersion medium such as an alcohol or toluene to prepare a positive composite paste. The resulting positive composite paste is applied to both surfaces of a sheet-shaped positive electrode substrate, dried, and then pressed to prepare a positive electrode. As a method for mixing the positive active material, the cation exchange resin, the conductive agent, the binding agent and the like, for example, a method is employed in which these components are mixed in a dry or wet process using a powder mixer such as a V-type mixer, a S-type mixer, a kneader, a ball mill or a planetary ball mill. For the cation exchange resin, the materials mentioned in the first embodiment can be appropriately used.

A negative electrode with a cation exchange resin contained in a negative composite layer can also be prepared by the above-described method.

A solution containing a cation exchange resin may be applied onto the positive composite layer or onto the negative composite layer to cover a surface of the positive electrode or the negative electrode with the cation exchange resin. Here, it is preferable that the solution containing a cation exchange resin impregnated with the composite layer, so that the cation exchange resin is present on a surface of and in the composite layer. Examples of the method for applying the solution containing a cation exchange resin include a spray method, a dispensing method, a dipping method and a blade coating method.

The cation exchange resin may be contained in at least one of the positive electrode and the negative electrode, but it is preferable that the cation exchange resin is contained in the positive electrode, or may be contained in both the positive electrode and the negative electrode. When the cation exchange resin is contained in the positive electrode, lithium polysulfide generated at the positive electrode during a charge-discharge reaction is inhibited from being dissolved in the positive electrode electrolyte present in the vicinity of the positive electrode, so that the capacity of the positive electrode is hardly reduced. When the cation exchange resin is contained in the positive electrode and the negative electrode, a lithium ion conduction path of the cation exchange resin is formed to extend from the positive electrode through the cation exchange resin layer to the negative electrode, so that lithium ion conduction can be improved to achieve a high discharge capacity and high charge-discharge efficiency.

The nonaqueous electrolytes (positive electrode electrolyte and negative electrode electrolyte) may contain an anion derived from an electrolyte salt. The anion in this embodiment refers to an anion derived from an electrolyte salt dissolved in the nonaqueous solvent, and does not include an anionic functional group such as a sulfonic acid group contained in the molecular structure of the cation exchange resin, lithium polysulfide, and a compound made anionic by dissociation of a part of lithium polysulfide.

The upper limit of the concentration of the anion contained in at least one of the positive electrode electrolyte and the negative electrode electrolyte is preferably 0.7 mol/l, more preferably 0.5 mol/l, still more preferably 0.3 mol/l. The upper limit of the concentration of the anion contained in the positive electrode electrolyte is preferably 0.3 mol/l, more preferably 0.2 mol/l, and may be 0 mol/l. When the concentration of the anion is not more than the above-mentioned upper limit, the viscosity of the nonaqueous electrolyte can be reduced, so that a nonaqueous electrolyte secondary battery having a high discharge capacity and excellent charge-discharge cycle performance can be obtained.

The lower limit of the concentration of the anion contained in at least one of the positive electrode electrolyte and the negative electrode electrolyte may be 0 mol/l, but is preferably 0.1 mol/l, more preferably 0.3 mol/l. When the nonaqueous electrolyte contains a small amount of an anion, excellent charge-discharge cycle performance can be obtained.

The positive electrode according to this embodiment includes a positive electrode substrate, and a positive composite layer disposed on the positive electrode substrate directly or with an intermediate layer interposed therebetween.

For the positive electrode substrate, a known material can be appropriately used as long as it is an electron conductor that does not have an adverse effect in a battery. For the positive electrode substrate, for example, aluminum, titanium, stainless steel, nickel, baked carbon, conductive polymers, conductive glass and the like, as well as aluminum, copper and the like, the surface of which is treated with carbon, nickel, titanium, silver or the like for the purpose of improving adhesion, conductivity and oxidation resistance, can be used. With regard to the shape of the positive electrode substrate, a foil-shaped material, a film-shaped material, a sheet-shaped material, a net-shaped material, a punched or expanded material, a lath material, a porous material, a foamed material, a molded material of fibers, and so on are used. While the thickness is not particularly limited, a material having a thickness of 1 to 500 µm is used.

The intermediate layer is a layer covering a surface of the positive electrode substrate, and contains a conductive agent such as carbon particles, so that contact resistance between the positive electrode substrate and the positive composite layer is reduced. The configuration of the intermediate layer is not particularly limited, and can be formed from, for example, a composition containing a binding agent and a conductive agent.

The positive composite layer contains an active material, a conductive agent and a binding agent, and the active material contains sulfur.

Preferably, sulfur combined with a conductive substance is used as the active material. Examples of the conductive substance include carbon materials such as porous carbon, carbon black, graphite and carbon fibers, and electron-conductive polymers such as polyaniline, polythiophene, polyacetylene and polypyrrole. The positive composite layer may contain an active material other than sulfur, a thickener, a filler and the like as necessary.

The positive composite layer is not required to contain sulfur in a solid state. Here, the positive composite layer contains only a conductive agent and a binding agent, and lithium polysulfide in the positive electrode electrolyte contributes to charge-discharge as an active material. It is preferable that the positive composite layer contains solid sulfur because the discharge capacity and energy density of the nonaqueous electrolyte secondary battery can be improved.

As a positive active material other than sulfur, a known material can be appropriately used as long as it is a positive active material capable of absorbing and releasing lithium ions. For example, the positive active material can be selected from a composite oxide represented by $Li_xMO_y$ (M represents at least one transition metal) ($Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$ or the like), and a polyanion compound represented by $Li_wMe_x(XO_y)_z$ (Me represents at least one transition metal, and X is, for example, P, Si, B or V) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ or the like). Incidentally, elements or polyanions in these compounds may be partially substituted with other elements or anionic species, and the surface may be covered with a metal oxide such as $ZrO_2$, MgO or $Al_2O_3$, or carbon. Further, examples of the positive active material include, but are not limited to, conductive polymer compounds such as disulfide, polypyrrole, polyaniline, polypara-styrene, polyacetylene and polyacene-based materials, pseudo graphite structure carbonaceous materials and elemental sulfur. These compounds may be used singly, or in combination of two or more thereof.

The conductive agent is not limited as long as it is an electron conductive material which does not adversely affect battery performance, and for example, conductive materials such as natural graphite (scaly graphite, scalelike graphite, earthy graphite and the like), artificial graphite, carbon black, acetylene black, ketjen black, carbon whiskers, carbon fibers, powders of metals (copper, nickel, aluminum, silver, gold and the like), metal fibers, and conductive ceramic materials can be included alone or as a mixture of two or more thereof. Among them, acetylene black is preferable as the conductive agent from the viewpoint of electron conductivity and coatability. The addition amount of the conductive agent is preferably 0.1% by mass to 50% by mass, more preferably 0.5% by mass to 30% by mass based on the total mass of the positive composite layer. It is preferable that acetylene black is ground into ultrafine particles of 0.1 to 0.5 μm in size because the necessary amount of carbon can be reduced.

As the binding agent, a binding agent that is commonly used in a nonaqueous electrolyte secondary battery, for example one of thermoplastic resins such as polytetrafluoroethylene (PTFE), polyvinylidene fluoride (PVDF), polyethylene and polypropylene; and polymers having rubber elasticity, such as ethylene-propylene-diene terpolymer (EPDM), sulfonated EPDM, styrene butadiene rubber (SBR) and fluorine rubber, or a mixture of two or more thereof can be used. The addition amount of the binding agent is preferably 1 to 50% by mass, more preferably 2 to 30% by mass based on the total mass of the positive composite layer.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler is not particularly limited as long as it does not adversely affect battery performance. Examples of the main component of the filler include polyolefins such as polypropylene and polyethylene, silica, alumina, zeolite and glass.

The negative electrode according to this embodiment includes a negative electrode substrate, and a negative composite layer disposed on the negative electrode substrate directly or with an intermediate layer interposed therebetween. The negative composite layer contains a negative active material and a binding agent. The negative composite layer may contain a conductive agent, a thickener, a filler and the like as necessary. The intermediate layer of the negative electrode may be the same as the intermediate layer of the positive electrode.

The negative active material to be used for the negative composite layer is not particularly limited as long as it is a material capable of electrochemically absorbing and releasing lithium ions, and a known material can be appropriately used. Examples of the negative active material include carbonaceous materials, metal oxides such as tin oxide and silicon oxide, metal composite oxides, elemental lithium and lithium alloys such as aluminum alloy, and metals capable of forming an alloy with lithium, such as Sn and Si. Examples of the carbonaceous material include graphite, cokes, non-graphitizable carbon, graphitizable carbon, fullerene, carbon nanotubes, carbon black and active carbon. Among them, graphite is preferable as a negative active material because it has an operating potential extremely close to that of metallic lithium, so that charge-discharge can be performed at a high operating voltage. For example, artificial graphite and natural graphite are preferable. In particular, graphite in which the surfaces of negative active material particles are modified with amorphous carbon or the like is preferable because gas generation during charge is small. These negative active materials may be used singly, or used in any combination and ratio of two or more thereof. Among them, a carbonaceous material or a lithium composite oxide is preferably used from the viewpoint of safety.

As the binding agent to be used for the negative composite layer, various binding agents as described above can be used. Incidentally, the negative composite layer may contain the above-described conductive agent, thickener, filler and the like.

For the negative electrode substrate, for example, copper, nickel, iron, stainless steel, titanium, aluminum, baked carbon, conductive polymers, conductive glass, Al—Cd alloys and the like, as well as copper and the like, the surface of which is treated with carbon, nickel, titanium, silver or the like for the purpose of improving adhesion, conductivity and reduction resistance, can be used.

With regard to the shape of the negative electrode substrate, a foil-shaped material, a film-shaped material, a sheet-shaped material, a net-shaped material, a punched or expanded material, a lath material, a porous material, a foamed material, a molded material of fibers, and so on are used.

While the thickness is not particularly limited, a material having a thickness of 1 to 500 μm is used.

In this embodiment, the cation exchange resin layer functions as a separator that insulates the positive electrode and the negative electrode from each other. The cation exchange resin layer contains a cation exchange resin. Examples of the cation exchange resin include polyacrylic acid, polymethacrylic acid, polyvinylbenzenesulfonic acid, polybenzenemethanesulfonic acid and polyacrylamide-2-methyl-1-propanesulfonic acid. Incidentally, a cation exchange resin can be obtained by introducing a sulfonic acid group (—SO$_3$H), a carboxylic acid group (—COOH), or a hydroxyl group (—OH) into any of various resins. Examples of the various resins include perfluorocarbon resins, aromatic polyether ketone resins, polyphenylene sulfide resins, polyether sulfone resins, polyphenylene oxide resins and polybenzimidazole resins.

A perfluorocarbon sulfonic acid type resin with a sulfonic acid group introduced into a perfluorocarbon resin is preferable because high ion conductivity can be attained.

The form in which the cation exchange resin layer contains a cation exchange resin is not particularly limited. A cation exchange film obtained by forming a cation exchange resin into a film shape, or a commercially available ion exchange film may be used. Specific examples thereof may include Nafion film (trade name, manufactured by Du Pont), Flemion (trade name, manufactured by ASAHI GLASS CO., LTD.) and Aciplex (trade name, manufactured by Asahi Kasei Corporation).

The cation exchange resin layer may be formed by filling the inside of a porous structure of a porous layer with a cation exchange resin. The method for filling the inside of the porous structure with the cation exchange resin is not particularly limited, and examples thereof may include a spray method, a dispensing method, a dipping method and a blade coating method.

The cation exchange resin layer does not have pores that communicate from one surface to the other surface. In other words, the cation exchange resin layer is nonporous. When the cation exchange resin layer is nonporous, the positive electrode electrolyte and the negative electrode electrolyte are not mixed, and thus the possibility that lithium polysulfide reaches the negative electrode is reduced. At least one of the surfaces may have pores or irregularities which do not communicate with the other surface.

Normally, commercially available cation exchange resins or cation exchange films are those of proton (H$^+$) type in which protons are bonded to anionic functional groups. In application of a cation exchange resin or a cation exchange film to a nonaqueous electrolyte secondary battery, it is preferable to convert the resin or film from a H$^+$ type to a lithium (Li$^+$) type. Conversion to the Li$^+$ type is performed by immersing the separator in a lithium hydroxide aqueous solution. After immersion, the separator is washed with deionized water at 25° C. until washing water is neutral. The temperature of the lithium hydroxide aqueous solution is preferably 70° C. to 90° C., and the immersion time is preferably 2 hours to 6 hours.

Preferably, the cation exchange resin layer contains a nonaqueous solvent for conduction of lithium ions in the layer. As the nonaqueous solvent contained in the cation exchange resin layer, various nonaqueous solvents usable for the later-described positive electrode electrolyte or negative electrode electrolyte can be appropriately used. A cation exchange resin layer which does not contain a nonaqueous solvent may be directly applied to a nonaqueous electrolyte secondary battery, but in some of cation exchange resins, a nonaqueous solvent (or nonaqueous electrolyte) has low swelling property, and therefore it is preferable to perform a swelling treatment with a nonaqueous solvent before preparation of a battery. The swelling treatment is performed by immersing in a nonaqueous solvent a cation exchange resin layer converted to the Li$^+$ type. The swelling treatment time is preferably 12 to 48 hours.

The amount of the nonaqueous solvent contained in the cation exchange resin layer may be 30% by mass or less based on the cation exchange resin layer. With such a configuration, the cation exchange resin layer is moderately swollen with the nonaqueous solvent, and movement of lithium ions in the cation exchange resin layer is facilitated. As a result, the discharge capacity of the nonaqueous electrolyte secondary battery can be increased.

In a method for adjusting the mass of a nonaqueous solvent contained in the cation exchange resin layer, a nonaqueous solvent having low impregnation property into a cation exchange resin may be used, or the amount of a nonaqueous solvent in which a cation exchange resin is immersed may be set to 30 mass % or less based on the amount of the cation exchange resin in advance. Examples of the solvent having low impregnation property into the cation exchange resin layer include ethers such as 1,3-dioxane, 1,4-dioxane, 1,2-dimethoxyethane, 1,4-dibutoxyethane, methyl diglyme, dimethyl ether and diethyl ether; chain carbonates such as dimethyl carbonate, diethyl carbonate and ethyl methyl carbonate; and cyclic carbonates such as ethylene carbonate, propylene carbonate and butylene carbonate. Incidentally, a nonaqueous solvent to be used for the later-described positive electrode electrolyte or negative electrode electrolyte can be appropriately used.

As the material that forms the porous layer may include polyolefin-based resins, typically polyethylene, polypropylene and the like; polyester-based resins, typically polyethylene terephthalate, polybutylene terephthalate and the like; polyvinylidene fluoride; vinylidene fluoride-hexa fluoropropylene copolymers; vinylidene fluoride-perfluorovinyl ether copolymers; vinylidene fluoride-tetrafluoroethylene copolymers; vinylidene fluoride-trifluoroethylene copolymers; vinylidene fluoride-fluoroethylene copolymers; vinylidene fluoride-hexafluoroacetone copolymers; vinylidene fluoride-ethylene copolymers; vinylidene fluoride-propylene copolymers; vinylidene fluoride-trifluoropropylene copolymers; vinylidene fluoride-tetrafluoroethylene-hexafluoropropylene copolymers; vinylidene fluoride-ethylene-tetrafluoroethylene copolymer; and the like can be used.

The nonaqueous solvent to be used for the positive electrode electrolyte and the negative electrode electrolyte is not limited, and one that is generally proposed to be used in a lithium secondary battery or the like can be used.

Examples of the nonaqueous solvent include, but are not limited to, cyclic carbonic acid esters such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethyl methyl carbonate; chain esters such as methyl formate, methyl acetate and methyl butyrate; tetrahydrofuran or a derivatives thereof ethers such as 1,3-dioxane, 1,4-dioxane, 1,2-dimethoxyethane, 1,4-dibutoxyethane and methyl diglyme; nitriles such as acetonitrile and benzonitrile; dioxolane or derivatives thereof ethylene sulfide, sulfolane, sultone or derivatives thereof. These compounds are used singly, or in mixture of two or more thereof.

In this embodiment, the positive electrode electrolyte or the negative electrode electrolyte may contain additives. As the additive, an electrolyte additive that is generally used in a nonaqueous electrolyte secondary battery can be used. Examples of the electrolyte additive include aromatic compounds such as biphenyl, alkylbiphenyls, terphenyl, partially hydrogenated products of terphenyl, cyclohexylbenzene, t-butylbenzene, t-amylbenzene, diphenyl ether and dibenzofuran; partially fluorinated products of the aromatic compounds such as 2-fluorobiphenyl, o-cyclohexylfluorobenzene and p-cyclohexyl fluorobenzene; fluorine-containing anisole compounds such as 2,4-difluoroanisole, 2,5-difluoroanisole, 2,6-difluoroanisole and 3,5-difluoroanisole; cyclic carbonates such as vinylene carbonate, methylvinylene carbonate, ethylvinylene carbonate, fluoroethylene carbonate, difluoroethylene carbonate and trifluoropropylene carbonate; carboxylic anhydrides such as succinic anhydride, glutaric anhydride, maleic anhydride, citraconic anhydride, glutaconic anhydride, itaconic anhydride and cyclohexanedicarboxylic anhydride; sulfur-containing compounds such as ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethylsulfoxide, tetramethylene sulfoxide, diphenyl sulfide, thioanisole, diphenyl disulfide and dipyridinium disulfide; perfluorooctane; tristrimethylsilyl borate; tristrimethylsilyl phosphate; and tetrakistrimethylsilyl titanate. These compounds can be used singly, or in combination of two or more thereof.

As the electrolyte salt contained in the positive electrode electrolyte or the negative electrode electrolyte, a known electrolyte salt can be appropriately used. Examples of the electrolyte salt include inorganic ionic salts containing one of lithium (Li), sodium (Na) and potassium (K), such as LiClO$_4$, LiBF$_4$, LiAsF$_6$, LiPF$_6$, LiSCN, LiBr, LiI, Li$_2$SO$_4$, Li$_2$BioClio, NaClO$_4$, NaI, NaSCN, NaBr, KC$_1$O$_4$ and KSCN; and organic ionic salts such as LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phthalate, lithium stearylsulfonate, lithium octylsulfonate and lithium dodecylbenzenesulfonate. These ionic compounds can be used singly, or in combination of two or more thereof.

Further, use of a mixture of LiPF$_6$ or LiBF$_4$ with a lithium salt having a perfluoroalkyl group, such as LiN(C$_2$F$_5$SO$_2$)$_2$ is more preferable because the viscosity of the electrolyte can be further reduced, so that low-temperature performance can be further improved, and self discharge can be suppressed.

As the nonaqueous electrolyte, a normal-temperature molten salt or an ionic liquid may be used.

The nonaqueous electrolyte secondary battery according to this embodiment is produced by the following method. The production method may include, for example, the steps of: (1) preparing a positive electrode; (2) preparing a negative electrode; (3) preparing a positive electrode electrolyte and a negative electrode electrolyte; (4) subjecting a first surface of a cation exchange resin layer to a roughening treatment; (5) immersing a cation exchange resin layer in a nonaqueous electrolyte or a nonaqueous solvent; (6) injecting the positive electrode electrolyte between the positive electrode and the cation exchange resin layer; (7) injecting the negative electrode electrolyte between the negative electrode and the cation exchange resin layer; (8) forming alternately stacked electrode groups by superimposing or winding the positive electrode and the negative electrode with the cation exchange resin layer interposed therebetween; (9) placing the positive electrode and the negative electrode (electrode group) in a battery container (case); and (10) sealing an opening section of the battery container.

The above steps (1) to (4) may be carried out in any order, and the steps (6) to (8) may be carried out simultaneously or sequentially.

The nonaqueous electrolyte secondary battery in this embodiment is, for example, a nonaqueous electrolyte secondary battery 1 (lithium ion secondary battery) shown in FIG. 1.

As shown in FIG. 1, the nonaqueous electrolyte secondary battery 1 includes a container 3, a positive electrode terminal 4, and a negative electrode terminal 5. The container 3 includes a container body that stores an electrode group 2 etc., and a lid plate being an upper wall. Incidentally, the electrode group 2, a positive electrode lead 4' and a negative electrode lead 5' are disposed inside the container body.

The positive electrode is electrically connected to the positive electrode terminal 4 through the positive electrode lead 4', and the negative electrode is electrically connected to the negative electrode terminal 5 through the negative electrode lead 5'. The positive electrode is impregnated with a positive electrode electrolyte, and the negative electrode is impregnated with a negative electrode electrolyte. Such liquids are not illustrated.

The electrode group 2 includes the positive electrode, the negative electrode and a separator, and is capable of storing electricity. Specifically, as shown in FIG. 2, the electrode group 2 is formed in such a manner that a separator 25 is disposed so as to be sandwiched between a negative electrode 23 and a positive electrode 21 in a layered form.

Figure 2:
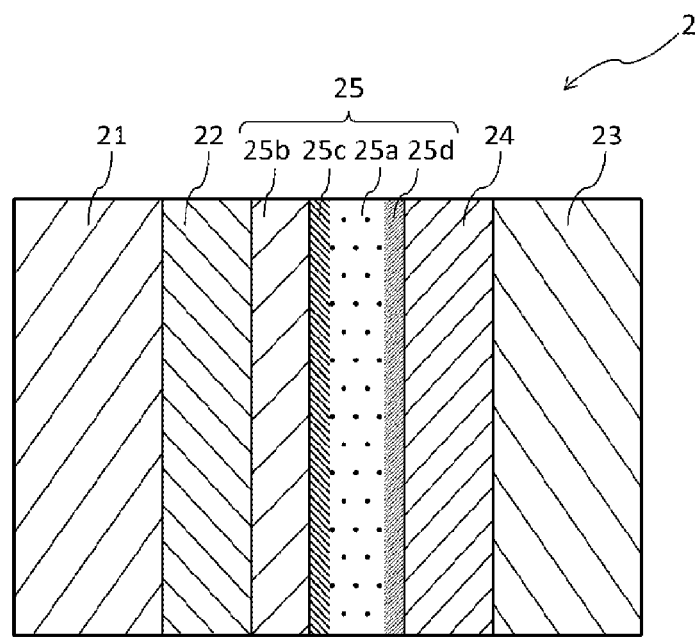
FIG. 2 is a schematic sectional view showing a partial configuration of the nonaqueous electrolyte secondary battery of the embodiment.

FIG. 2 is a partial schematic sectional view of the electrode group 2. The electrode group 2 includes a positive electrode electrolyte 22 between a positive electrode 21 and a separator 25, and a negative electrode electrolyte 24 between a negative electrode 23 and a separator 25. The positive electrode electrolyte 22 and the negative electrode electrolyte 24 may be the same, or different. The separator 25 includes a cation exchange resin layer 25a having a first surface 25c and a second surface 25d, and a porous layer 25b. The first surface 25c and the porous layer 25b are in contact with each other. The roughness factor of the first surface 25c of the cation exchange resin layer 25a is 3 or more.

In FIG. 2, the positive electrode electrolyte 22 is disposed between the positive electrode 21 and the porous layer 25b, and the negative electrode electrolyte 24 is disposed between the negative electrode 23 and the cation exchange resin layer 25a. However, the positive electrode 21 and the porous layer 25b are impregnated with the positive electrode electrolyte 22, and the negative electrode 23 is impregnated with the negative electrode electrolyte 24, and therefore in a practical battery, the positive electrode 21 is in contact with the porous layer 25b, and the negative electrode 23 is in contact with the cation exchange resin layer 25a. That is, in the battery, the positive electrode 21, the porous layer 25b, the cation exchange resin layer 25a and the negative electrode 23 are laminated in this order.

The separator 25 has a structure in which the cation exchange resin layer 25a having a first surface 25c, and the porous layer 25b are laminated. The first surface 25c is in contact with the porous layer 25b. The cation exchange resin layer 25a contains a cation exchange resin, and inhibits lithium polysulfide $Li_2S_x$ ($4 \leq x \leq 8$), which is generated at the positive electrode 21 and/or contained in the positive electrode electrolyte 22, from reaching the negative electrode. Thus, lithium polysulfide generated in the positive electrode 21 and/or contained in the positive electrode electrolyte 22 is hindered from reaching the negative electrode, so that a shuttle phenomenon is suppressed.

In FIG. 2 and examples as described later, the positive electrode, the porous layer, the cation exchange resin layer and the negative electrode are arranged in this order, and the roughness factor of the first surface of the cation exchange resin layer, i.e. a surface that is in contact with the porous layer, is 3 or more. The roughness factor of the second surface, i.e. a surface that is in contact with the negative electrode, may also be 3 or more. That is, the roughness factor of each of the first surface and the second surface of the cation exchange resin layer may be 3 or more. When the roughness factor of each of both surfaces of the cation exchange resin layer is 3 or more, the interface resistance of the cation exchange resin layer can be reduced, so that the high rate discharge performance of the battery can be improved.

The positive electrode, the cation exchange resin layer, the porous layer and the negative electrode may be disposed in this order, and the roughness factor of a surface of the cation exchange resin layer, which is in contact with the porous layer, may be 3 or more. Accordingly, interface resistance between the cation exchange resin layer and the porous layer can be reduced. Incidentally, the positive electrode, the porous layer, the cation exchange resin layer, the porous layer and the negative electrode may be disposed in this order. Here, the roughness factor of each of both surfaces of the cation exchange resin layer is preferably 3 or more. Accordingly, interface resistance between the cation exchange resin layer and the porous layer can be reduced, so that the high rate discharge performance of the battery can be improved.

In FIG. 2 and the examples as described later, each of the cation exchange resin layer and the porous layer is a single layer, but there may be a plurality of cation exchange resin layers or porous layers. Here, all the cation exchange resin layers may be provided with the first surface having a roughness factor of 3 or more, but it suffices that at least one cation exchange resin layer is provided with the first layer. This is because the interface resistance of the cation exchange resin layer can be reduced, and the high rate discharge performance of the battery can be improved.

Figure 3:
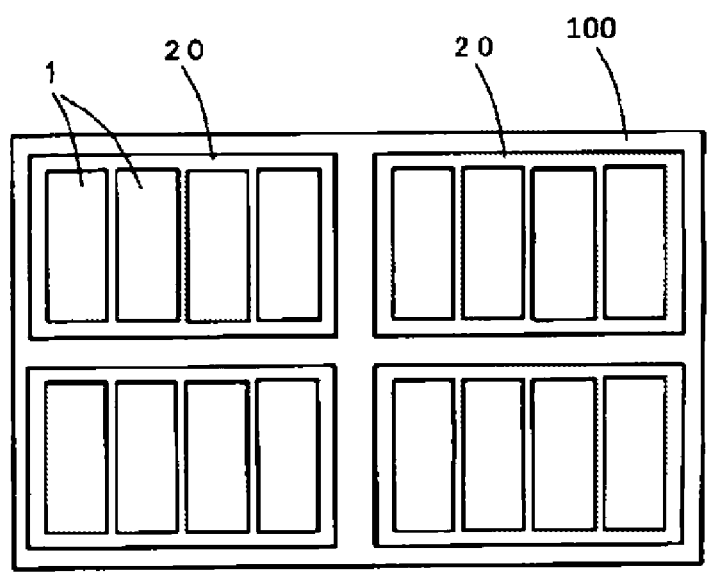
FIG. 3 is a schematic view showing an energy storage apparatus formed by assembling a plurality of nonaqueous electrolyte secondary batteries according to the embodiment.

The configuration of the nonaqueous electrolyte secondary battery according to the present invention is not particularly limited, and examples of the nonaqueous electrolyte secondary battery include cylindrical batteries, prismatic batteries (rectangular batteries) and flat batteries. The present invention may also encompass an energy storage apparatus including a plurality of nonaqueous electrolyte secondary batteries described above. FIG. 3 shows one embodiment of an energy storage apparatus. In FIG. 3, an energy storage apparatus 100 includes a plurality of energy storage units 20. Each of the energy storage units 20 includes a plurality of nonaqueous electrolyte secondary batteries 1. The energy storage apparatus 100 can be mounted as a power source for an automobile such as an electric vehicle (EV), a hybrid vehicle (HEV), a plug-in hybrid vehicle (PHEV), or the like.

EXAMPLES

Example 1-1

Both surfaces of a 50 μm-thick Nafion film (manufactured by Sigma-Aldrich Company) as a cation exchange film were subjected to a roughening treatment using a #P320 sandpaper in which a polishing material for polished cloth and paper has a grain size of 320 μm as specified in JIS R 6010:2000. One surface was polished with the sandpaper eighty times. This film is defined as a cation exchange film in Example 1-1.

Example 1-2

Except that a #P400 sandpaper was used, the same procedure as in Example 1-1 was carried out to subject a Nafion film to a roughening treatment. This film is defined as a cation exchange film in Example 1-2.

Example 1-3

Except that a #P1000 sandpaper was used, the same procedure as in Example 1-1 was carried out to subject a Nafion film to a roughening treatment. This film is defined as a cation exchange film in Example 1-3.

Examples 1-4 to 1-6

Except that the number of times the surface was polished with a sandpaper was changed to set the roughness factor, the arithmetic mean roughness Ra and the maximum height roughness Rz to values as shown in Table 1, the same procedure as in Example 1-3 was carried out to prepare cation exchange films of Examples 1~4 to 1-6.

Comparative Example 1-1

A Nafion film which was not subjected to a roughening treatment is defined as a cation exchange film of Comparative Example 1-1.

1. Observation of Surface Morphology

The surface morphology of the cation exchange film in each of Examples 1-1 to 1-6 and Comparative Example 1-1 was observed under the following conditions, and the roughness factor, the arithmetic mean roughness Ra and the maximum height roughness Rz were calculated.
    Measuring equipment: Ultra-Deep Shape Measurement Microscope VK-8500 (Manufactured by KEYENCE CORPORATION)
    Measurement range: $1.04 \times 10^{-3}$ cm$^2$
    Shape analysis application: VK-H1A9 (Manufactured by KEYENCE CORPORATION)

2. Interface Resistance Measurement

[2-1. Impregnation Treatment of Cation Exchange Film]

The cation exchange film in each of Examples 1-1 to 1-6 and Comparative Example 1-1 was immersed in a water/alcohol solution of 1 mol/l of lithium hydroxide, and stirred at 80° C. for 12 hours to exchange protons in the cation exchange film with lithium ions. The cation exchange film in each of examples and comparative examples after stirring was washed with deionized water, and dried under a degassed atmosphere at 120° C. to remove lithium hydroxide and the solvent.

The resulting Li$^+$-type cation exchange film was subjected to an impregnation treatment by immersing the film under an environment at 25° C. for 12 hours in a mixed solvent obtained by mixing 1,2-dimethoxyethane (DME) and 1,3-dioxolane (DOL) at a volume ratio of 50:50. Through the treatment, the cation exchange film after the impregnation treatment was impregnated with 20% by mass of a mixed solvent based on the mass of the ion exchange film before the impregnation treatment. The thicknesses of the cation exchange film before and after the impregnation treatment were 50 μm and 64 μm, respectively.

[2-2. Measurement of Electrolyte Layer Resistance R]

Figure 4:
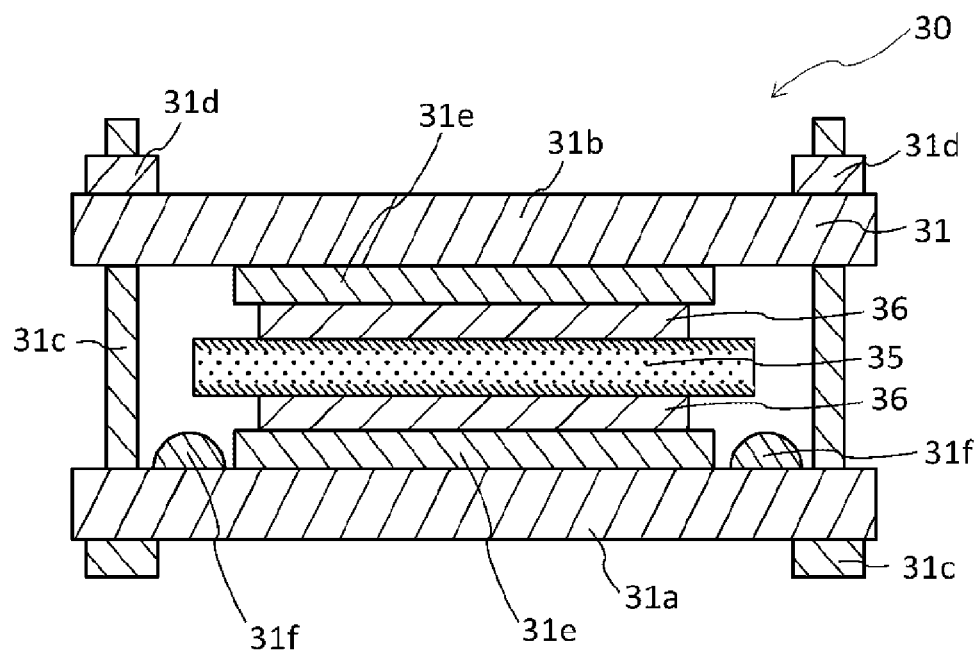
FIG. 4 is a schematic sectional view showing a configuration of a resistance measurement cell used in an example of the embodiment.

A resistance measurement cell 30 was prepared using the cation exchange film in each of examples and comparative examples after the impregnation treatment, and an electrochemical measurement cell 31 (manufactured by Nippon Tom Cell, Ltd.) as shown in FIG. 4. Inside an O-ring 31*f* provided on a stainless steel plate support 31*a* and having an inner diameter of 26 mm and an outer diameter of 34 mm, a stainless steel plate electrode 31*e* and a porous film (porous layer) 36 were laminated so as to sandwich a cation exchange resin layer 35 therebetween. A stainless steel plate lid body 31*b* was superposed on the layered product, and the laminate and the lid body 31*b* were fastened together with a bolt 31*c* and a nut 31*d* to form a resistance measurement cell 30. The polyethylene microporous film 36 is impregnated with a nonaqueous electrolyte containing 0.3 mol/l of lithium bis(trifluoromethanesulfonyl)imide (LiTFSI), and a mixture of DME and DOL at a ratio of 50:50 (volume ratio).

Using the resistance measurement cell, electrolyte layer resistance R was measured by a.c. impedance measurement. The a.c. impedance measurement was performed at an applied voltage amplitude of 5 mV and a frequency of 1 MHz to 100 mHz. A Nyquist diagram of measurement results was prepared, and fitting was performed using an equivalent circuit. Among the intersections of a real axis and a curve obtained by fitting a circular arc appearing on the highest frequency side, the value of an interaction on the low frequency side was read, and defined as electrolyte resistance R. The electrolyte layer resistance R includes porous layer resistance Re that is the resistance of the polyethylene microporous film 36; interface resistance Ri that is the resistance of the interface between the polyethylene microporous film 36 and the cation exchange film 35 after the impregnation treatment; and cation exchange resin layer resistance Rc that is the resistance of the cation exchange film 35 after impregnation treatment. The electrolyte layer resistance R is expressed by the following formula (1).

$$R = 2Re + 2Ri + Rc \quad (1)$$

[2-3. Measurement of Cation Exchange Resin Layer Resistance Rc]

Except that a polyethylene microporous film impregnated with an electrolyte solution of DME and DOL (50:50 (volume ratio)) containing 0.3 mol/l of LiTFSI was not disposed, the same procedure as in the section [2-2. Measurement of Electrolyte Layer Resistance R] was carried out to perform a.c. impedance measurement. The resistance determined by the measurement was defined as cation exchange resin layer resistance Rc.

[2-4. Measurement of Porous Layer Resistance Re]

Except that the cation exchange film after the impregnation treatment was not disposed, and only one polyethylene microporous film impregnated with an electrolyte solution of DME and DOL (50:50 (volume ratio)) containing 0.3 mol/l of LiTFSI was disposed, the same procedure as in the section [2-3. Measurement of Cation Exchange Resin Layer Resistance Rc] was carried out to perform a.c. impedance measurement. The resistance determined by the measurement was defined as porous layer resistance Re.

From the values of electrolyte layer resistance R, cation exchange resin layer resistance Rc and porous layer resistance Re each determined by a.c. impedance measurement, interface resistance Ri was calculated using the formula (1).

The concentration of LiTFSI in the electrolyte solution impregnated into the polyethylene microporous film was changed to a value as shown in Table 2, a.c. impedance measurement was performed using the cation exchange film in each of examples and comparative examples after the impregnation treatment, and interface resistance Ri was calculated. When the concentration of LiTFSI was 0.5 mol/l, measurement was performed only in Examples 1-1 to 1-3 and Comparative Example 1-1.

For the cation exchange films of Example 1-2 and Comparative Example 1-1, the sulfur equivalent concentration of lithium polysulfide in the electrolyte solution impregnated into the polyethylene microporous film was set to 3.0 mol/l, and the concentration of LiTFSI was changed to a value as shown in Table 3, a.c. impedance measurement was performed, and interface resistance Ri was calculated.

The electrolyte solution containing lithium polysulfide was prepared in the following manner. In a nonaqueous solvent obtained by mixing DME and DOL at a volume ratio of 50:50, lithium polysulfide ($Li_2S$) and sulfur ($S_8$) were added at a stoichiometric ratio (molar ratio of 8:5) allowing $Li_2S_6$ to be generated, in a glove box at a dew point of −50° C. or lower, and the mixture was stirred. The resulting solution was encapsulated in a closed container, and left standing in a thermostatic bath at 80° C. for 4 days to react $Li_2S$ and $S_8$, thereby preparing a solution containing lithium polysulfide. In the lithium polysulfide solution, lithium polysulfide is dissolved in a concentration of 3.0 mol/l in terms of sulfur. LiTFSI was dissolved in this solution in such a manner that the concentration of LiTFSI was 0, 0.3, 0.5 or 1.0 mol/l, thereby preparing an electrolyte solution containing lithium polysulfide.

Figure 6:
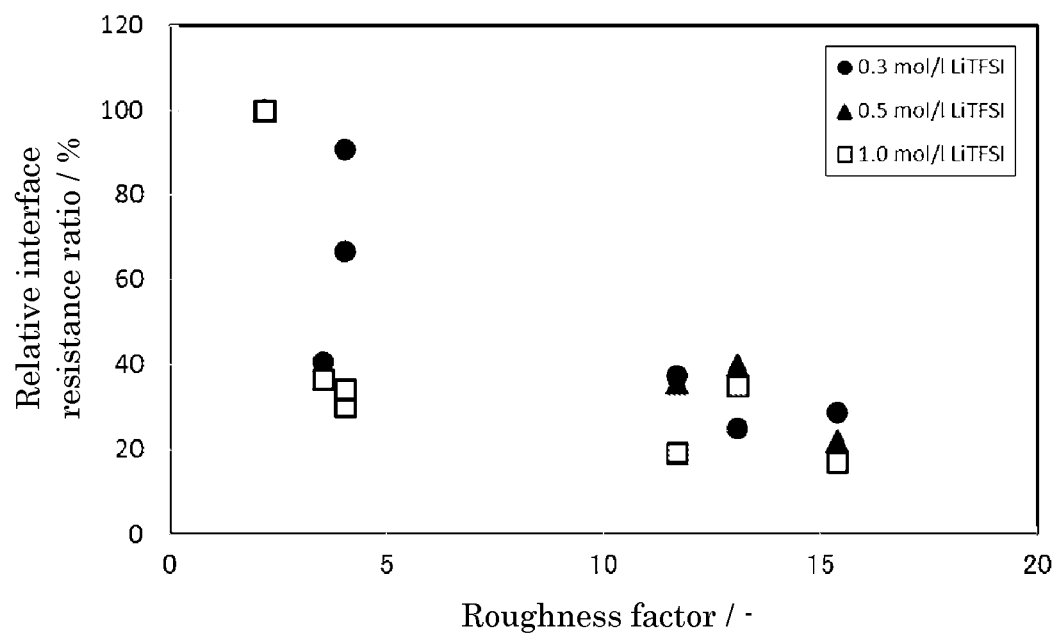
FIG. 6 is a view showing a relationship between interface resistance and a roughness factor of a surface of a cation exchange resin layer in examples.
Figure 7:
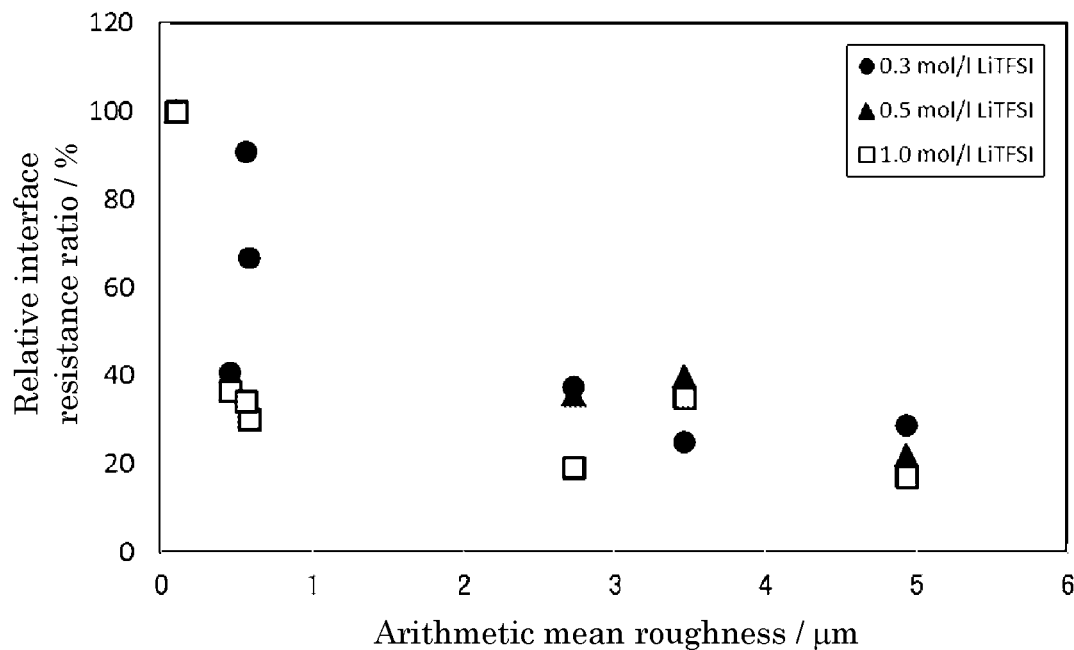
FIG. 7 is a view showing a relationship between interface resistance and an arithmetic mean roughness of a surface of a cation exchange resin layer in examples.
Figure 8:
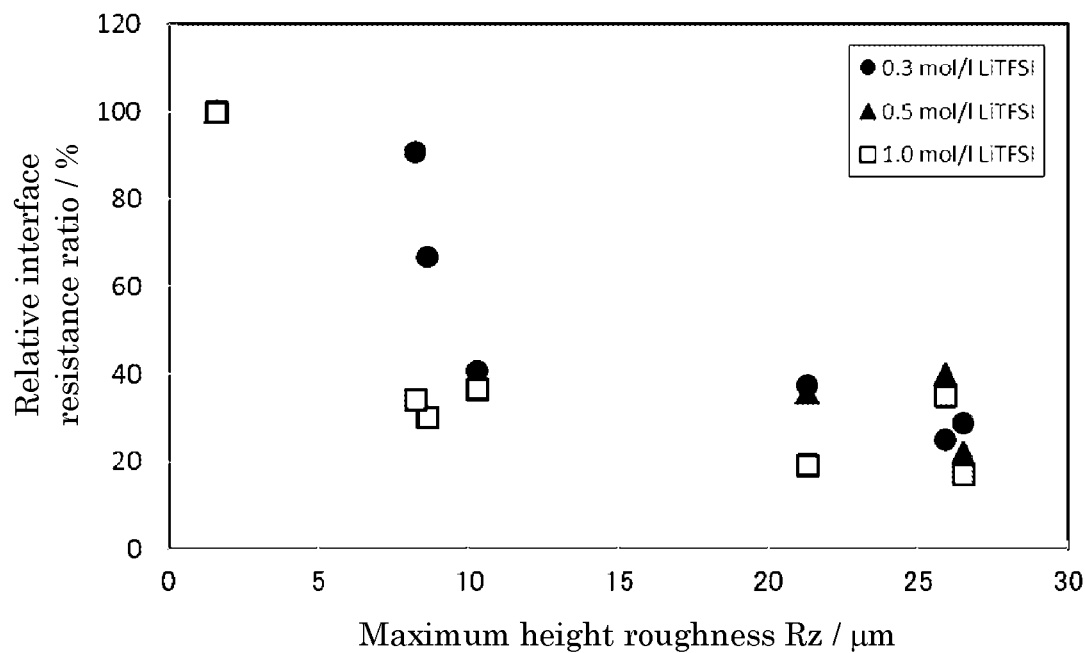
FIG. 8 is a view showing a relationship between interface resistance and a maximum height roughness of a surface of a cation exchange resin layer in examples.

For the cation exchange films in examples and comparative examples, the roughness factor, the arithmetic mean roughness Ra and the maximum height roughness Rz are shown in Table 1, and interface resistance Ri between the cation exchange film after the impregnation treatment and each of polyethylene microporous films containing an electrolyte solution and having different concentrations of LiTFSI and lithium polysulfide is shown in Tables 2 and 3. FIGS. 6 to 8 show graphs in which a value obtained by dividing interface resistance in each of Examples 1-1 to 1-6 by interface resistance in Comparative Example 1-1 is plotted against the roughness factor, the arithmetic mean roughness Ra and the maximum height roughness Rz.

TABLE 1

| | Surface area per unit area/m2/m2 | Arithmetic mean roughness Ra/μm | Maximum height roughness Rz/μm |
|---|---|---|---|
| Comparative Example 1-1 | 2.18 | 0.10 | 1.61 |
| Example 1-1 | 15.4 | 4.93 | 26.5 |
| Example 1-2 | 13.1 | 3.46 | 25.9 |
| Example 1-3 | 11.7 | 2.73 | 21.3 |
| Example 1-4 | 3.54 | 0.46 | 10.3 |
| Example 1-5 | 4.03 | 0.59 | 8.63 |
| Example 1-6 | 4.04 | 0.56 | 8.23 |

TABLE 2

| | Li salt concentration | | |
|---|---|---|---|
| | 0.3 mol/l | 0.5 mol/l | 1.0 mol/l |
| Comparative Example 1-1 | 63.8 | 92.7 | 490 |
| Example 1-1 | 18.3 | 20.5 | 83.3 |
| Example 1-2 | 15.9 | 37.0 | 171 |
| Example 1-3 | 23.8 | 33.3 | 95.0 |
| Example 1-4 | 25.9 | — | 180 |
| Example 1-5 | 42.5 | — | 148 |
| Example 1-6 | 58.0 | — | 168 |

TABLE 3

| | Li salt concentration | | | |
|---|---|---|---|---|
| | 0 mol/l | 0.3 mol/l | 0.5 mol/l | 1.0 mol/l |
| Comparative Example 1-1 | 50.8 | 64.0 | 158 | 494 |
| Example 1-2 | 32.3 | 43.5 | 104 | 319 |

It was found that by performing a roughening treatment with a sandpaper, all of the roughness factor, the arithmetic mean roughness Ra and the maximum height roughness Rz were increased as shown in Table 1. Incidentally, it was revealed that regardless of the concentration of LiTFSI or the presence/absence of lithium polysulfide, the cation exchange film in each of Examples 1-1 to 1-6, which was subjected to a roughening treatment, had lower interface resistance Ri as compared to the cation exchange film in Comparative Example 1-1, which was not subjected to a roughening treatment, as shown in Tables 2 and 3 and FIGS. 4 to 6. Further, when the concentration of LiTFSI was as low as 0.3 mol/l, Examples 1-1 to 1-4 in which the maximum height roughness of the surface of the cation exchange film was 10 μm or more showed lower interface resistance as compared to Examples 1-5 and 1-6 in which the maximum height roughness was less than 10 μm. Incidentally, when the concentration of LiTFSI was as high as 1.0 mol/l, Examples 1-1 to 1-3 and Examples 1-5 and 1-6 in which the arithmetic mean roughness Ra was 0.5 μm or more showed lower interface resistance as compared to Example 1-4 in which the arithmetic mean roughness Ra was less than 0.5 μm.

It was found that even when lithium polysulfide was contained, interface resistance was reduced by roughening the surface of the cation exchange film as shown in Table 3.

3. High Rate Discharge Test

Example 2-1

Magnesium citrate was subjected to a carbonization treatment at 900° C. under an argon atmosphere for 1 hour, and then immersed in a 1 mol/l of sulfuric acid aqueous solution to extract MgO. Subsequently, the residue was washed and dried to obtain porous carbon. The porous carbon and sulfur were mixed at a mass ratio of 30:70. The mixture was encapsulated in a closed vessel under an argon atmosphere, heated to 150° C. at a temperature elevation rate of 5° C./min, held for 5 hours, and then allowed to cool to 80° C. Thereafter, the mixture was heated again to 300° C. at a temperature elevation rate of 5° C./min, and held for 2 hours to be heat-treated, thereby obtaining a carbon-sulfur composite (hereinafter, also referred to as a "SPC composite").

A positive electrode paste containing a SPC composite as a positive active material, acetylene black as a conductive agent, and polyvinylidene fluoride (PVDF) as a binding agent at a mass ratio of 85:5:10 and having N-methylpyrrolidone (NMP) as a solvent was prepared. The resulting positive electrode paste was filled into a nickel mesh current collector, and then dried to prepare a positive electrode plate. The coating amount of the positive electrode paste was 1.2 mg/cm$^2$.

As a negative electrode plate, one obtained by attaching metallic Li to a 10 μm-thick copper foil so that the total thickness of the negative electrode was 310 μm was used.

As a cation exchange film, a Nafion film subjected to a roughening treatment only at one surface using a #P400 sandpaper was used.

As a positive electrode electrolyte solution, a solution containing lithium polysulfide with a sulfur equivalent concentration of 3.0 mol/l, and including a mixture of DME and DOL at a volume ratio of 50:50 was used.

As a negative electrode electrolyte solution, a solvent obtained by mixing DME and DOL at a volume ratio of 50:50 was used.

Figure 5:
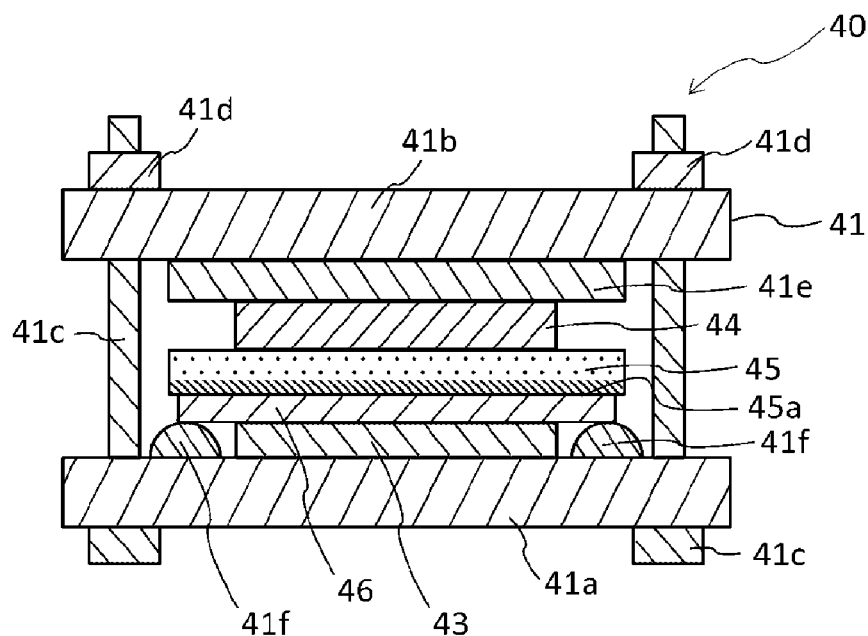
FIG. 5 is a schematic sectional view showing a configuration of a test cell used in an example of the embodiment.

A test cell 40 was prepared using an electrochemical measurement cell 41 (manufactured by Nippon Tom Cell, Ltd.) as shown in FIG. 5. First, a positive electrode 43 prepared in the manner described above is disposed inside an O-ring 41f provided on a stainless steel plate support 41a and having an inner diameter of 26 mm and an outer diameter of 34 mm. A porous film (porous layer) 46 impregnated with a positive electrode electrolyte was laminated, and a cation exchange resin layer 45 having a size larger than the inner diameter of the O-ring was then disposed. Here, the cation exchange resin layer 45 was disposed in such a manner that a first surface 45a subjected to the roughening treatment was in contact with the porous film 46. A negative electrode 44 impregnated with a negative electrode electrolyte was laminated on the cation exchange resin layer 45. A stainless steel plate electrode 41e was disposed on the negative electrode 44, a stainless steel plate lid body 41b was superposed thereon, and the electrode 41e, the negative electrode 64 and the lid body 41b were fastened together with a bolt 41c and a nut 41d to form a test cell 40 (hereinafter, also referred to as a "battery"). The test cell 40 is defined as an example battery 2-1.

Comparative Example 2-1

Except that as a Nafion film which was not subjected to a roughening treatment was used as a cation exchange film, the same procedure as in Example 2-1 was carried out to prepare a test cell 30 according to Comparative Example 2-1. The test cell 30 is defined as a comparative example battery 2-1.

The 0.1 C discharge capacity and the 0.2 C discharge capacity of each of the example battery 2-1 and the comparative example battery 2-1 were measured by the following method, and the 0.2 C discharge capacity was divided by the 0.1 C discharge capacity to calculate a 0.2 C/0.1 C ratio (%).

0.1 C constant current discharge to 1.5 V and 0.1 C constant current charge to 3.0 V were performed at 25° C. As a condition for termination of charge and discharge, charge and discharge were terminated at the time of reaching a predetermined voltage or elapse of 10 hours. With the 0.1 C discharge and charge step as one cycle, the cycle was repeated three times. The value obtained by dividing the discharge capacity at the third cycle by the mass of the SPC composite was defined as a 0.1 C discharge capacity (mAh/g).

The value of 1 C was defined as a current value at which the capacity of a positive active material is discharged in an hour where the capacity per mass of SPC composite used as a positive active material is 1675 mAh/g that is a theoretical capacity.

Next, 0.2 C constant current discharge to 1.5 V and 0.2 C constant current charge to 3.0 V were performed at 25° C. As a condition for termination of charge and discharge, charge and discharge were terminated at the time of reaching a predetermined voltage or elapse of 5 hours. With the 0.2 C discharge and charge step as one cycle, the cycle was repeated three times. The value obtained by dividing the discharge capacity at the third cycle by the mass of the SPC composite was defined as a 0.2 C discharge capacity (mAh/g). The 0.2 C discharge capacity was divided by the 0.1 C discharge capacity to calculate a 0.2 C/0.1 ratio (%).

Figure 9:
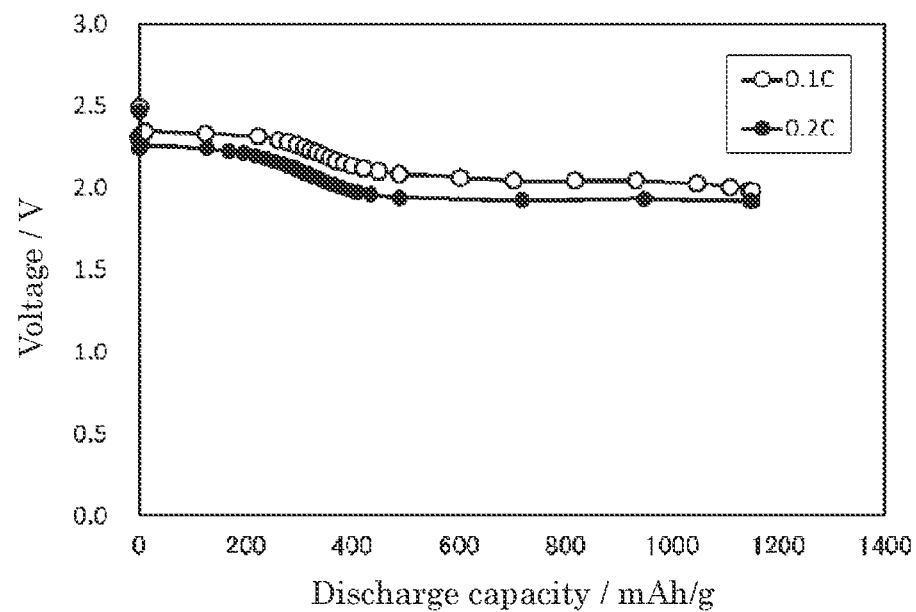
FIG. 9 is a view showing a discharge curve of an example battery 2-1.
Figure 10:
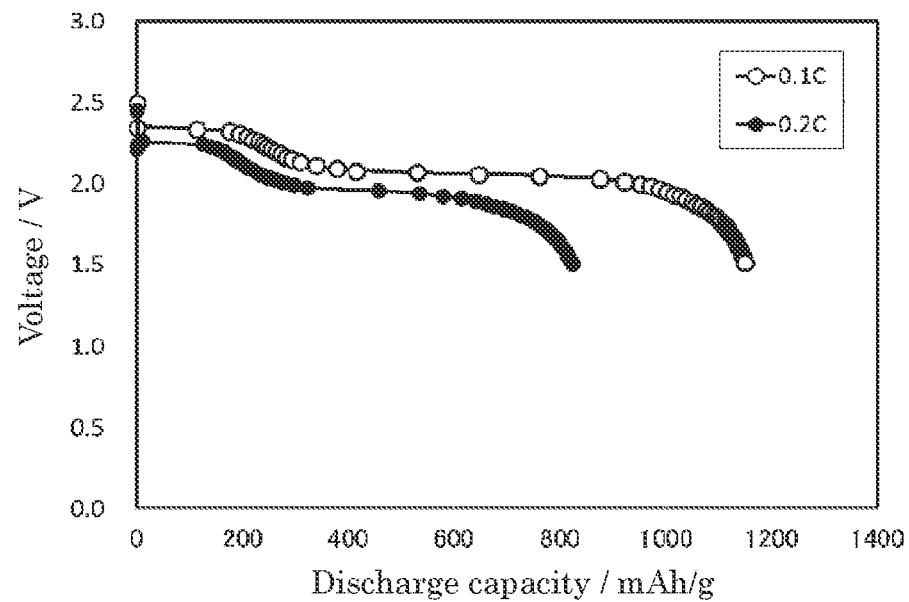
FIG. 10 is a view showing a discharge curve of a comparative example battery 2-1.

The 0.1 C discharge capacities, 0.2 C discharge capacities and 0.2 C/0.1 C ratios (%) of the example battery 2-1 and the comparative example battery 2-1 are shown in Table 4. The 0.1 C and 0.2 C discharge curves of the example battery 2-1 and the comparative example battery 2-1 are shown in FIGS. 9 and 10.

TABLE 4

|  | 0.1 C discharge capacity/ mAh/g | 0.2 C discharge capacity/ mAh/g | 0.2 C/0.1 C ratio/% |
|---|---|---|---|
| Example battery 2-1 | 1150 | 1150 | 100 |
| Comparative example battery 2-1 | 1150 | 824 | 71.7 |

The example battery 2-1 exhibited a high discharge capacity of 1150 mAh/g at both of discharge currents of 0.1 C and 0.2 C, and had a 0.2 C/0.1 C ratio of 100%. On the other hand, the comparative example battery 2-1 had a 0.1 C discharge capacity comparable to that in the example battery 2-1, but had a low 0.2 C discharge capacity, and a 0.2 C/0.1 C ratio of 71.7%. This may be because in the example battery 2-1, a cation exchange film with a surface subjected to a roughening treatment was used as a cation exchange resin layer, and therefore interface resistance decreased, leading to improvement of high rate discharge performance.

In the example battery 2-1, as shown in FIG. 9, the discharge potential did not decrease even after discharge of a capacity of 1150 mAh/g which corresponds to the capacity of sulfur in the positive active material layer. On the other hand, in the comparative example battery 2-1, a phenomenon was observed in which the discharge potential decreased at the end of discharge as shown in FIG. 10. This may be because due to a decrease in interface resistance of the cation exchange resin layer by the roughening treatment, the positive electrode surface had a more uniform current distribution. Incidentally, it is considered that retainability of lithium polysulfide on the positive electrode surface was improved by the roughening treatment, resulting in enhancement of contribution of lithium polysulfide contained in the positive electrode electrolyte solution to the charge-discharge reaction.

INDUSTRIAL APPLICABILITY

According to the embodiment of the present invention, a nonaqueous electrolyte secondary battery excellent in high rate discharge performance can be obtained, and the nonaqueous electrolyte secondary battery is useful as a secondary battery for a wide range of uses such as on-vehicle uses and stationary uses.

DESCRIPTION OF REFERENCE SIGNS

1: Nonaqueous electrolyte secondary battery
2: Electrode group
3: Battery container
4: Positive electrode terminal
4': Positive electrode lead
5: Negative electrode terminal
5': Negative electrode lead
20: Energy storage unit
21, 43: Positive electrode
22: Positive electrode electrolyte solution
23, 44: Negative electrode
24: Negative electrode electrolyte solution
25: Separator
25a, 35, 45: Cation exchange resin layer
25b, 36, 46: Porous layer (porous film)
25c, 45a: First surface
25d: Second surface
30: Resistance measurement cell
31, 41: Electrochemical measurement cell
31a, 41a: Support
31b, 41b: Lid body
31c, 41c: Bolt
31d, 41d: Nut
31e, 41e: Electrode
31f, 41f O-ring
40: Test cell
100: Energy storage apparatus

The invention claimed is:

1. A nonaqueous electrolyte secondary battery comprising:
a sulfur-containing positive electrode impregnated with a nonaqueous positive electrode electrolyte;
a negative electrode impregnated with a nonaqueous negative electrode electrolyte; and
a cation exchange resin layer which comprises a cation exchange resin and is disposed between the positive electrode and the negative electrode, and has a first surface, which is in direct contact with one of the positive electrode impregnated with the nonaqueous positive electrode electrolyte or the negative electrode impregnated with the nonaqueous negative electrode electrolyte, and a second surface, which is in direct contact with another one of the positive electrode impregnated with the nonaqueous positive electrode electrolyte or the negative electrode impregnated with the nonaqueous negative electrode electrolyte, the first surface having a roughness factor of 3 or more,
wherein the cation exchange resin layer is in direct contact with the positive electrode impregnated with the nonaqueous positive electrode electrolyte and the negative electrode impregnated with the nonaqueous negative electrode electrolyte, and
the cation exchange resin layer is nonporous throughout the first surface to the second surface.

2. The nonaqueous electrolyte secondary battery according to claim 1, wherein the first surface of the cation exchange resin layer has an arithmetic mean roughness Ra of 0.5 μm or more.

3. The nonaqueous electrolyte secondary battery according to claim 1, wherein the first surface of the cation exchange resin layer has a maximum height roughness Rz of 5 μm or more.

4. The nonaqueous electrolyte secondary battery according to claim 1, wherein the nonaqueous positive electrode electrolyte contains lithium polysulfide, and a sulfur equivalent concentration of the nonaqueous positive electrode electrolyte is higher than the sulfur equivalent concentration of the nonaqueous negative electrode electrolyte.

5. The nonaqueous electrolyte secondary battery according to claim 4, wherein the sulfur equivalent concentration of the nonaqueous positive electrode electrolyte is 1.2 mol/l or more.

6. The nonaqueous electrolyte secondary battery according to claim 5, wherein the sulfur equivalent concentration of the nonaqueous positive electrode electrolyte is 3.0 mol/l or more.

7. The nonaqueous electrolyte secondary battery according to claim 4, wherein the sulfur equivalent concentration of the nonaqueous positive electrode electrolyte is 18 mol/l or less.

8. The nonaqueous electrolyte secondary battery according to claim 4, wherein a concentration of an anion contained in at least one of the nonaqueous positive electrode electrolyte and the nonaqueous negative electrode electrolyte is 0.7 mol/l or less.

9. The nonaqueous electrolyte secondary battery according to claim 4, wherein the concentration of an anion contained in the nonaqueous positive electrode electrolyte is 0.3 mol/l or less.

10. The nonaqueous electrolyte secondary battery according to claim 1, wherein at least one of the positive electrode and the negative electrode includes a second cation exchange resin, and a concentration of an anion contained in at least one of the nonaqueous positive electrode electrolyte and the nonaqueous negative electrode electrolyte is 0.7 mol/l or less.

11. A method for producing a nonaqueous electrolyte secondary battery including a sulfur-containing positive electrode, a negative electrode, and a cation exchange resin layer which comprises a cation exchange resin and is interposed between the positive electrode and the negative electrode, and has a first surface, which is in direct contact with one of the positive electrode or the negative electrode, and a second surface, which is in direct contact with another one of the positive electrode or the negative electrode, the first surface having a roughness factor of 3 or more, the method comprising injecting a lithium polysulfide-containing positive electrode electrolyte between the positive electrode and the cation exchange resin layer to impregnate the positive electrode electrolyte in the positive electrode, and injecting a negative electrode electrolyte between the negative electrode and the cation exchange resin layer to impregnate the negative electrode electrolyte in the negative electrode, the negative electrode electrolyte having a lithium polysulfide concentration lower than that of the positive electrode electrolyte,
- wherein the cation exchange resin layer is in direct contact with the positive electrode impregnated with the positive electrode electrolyte and the negative electrode impregnated with the negative electrode electrolyte, and
- the cation exchange resin layer is nonporous throughout the first surface to the second surface.

\* \* \* \* \*